(12) United States Patent
Wang et al.

(10) Patent No.: US 8,437,991 B2
(45) Date of Patent: May 7, 2013

(54) SYSTEMS AND METHODS FOR PREDICTING HEAT TRANSFER COEFFICIENTS DURING QUENCHING

(75) Inventors: Qigui Wang, Rochester Hills, MI (US);
Bowang Xiao, Worcester, MA (US);
Gang Wang, Worcester, MA (US);
Yiming Rong, Shrewsbury, MA (US);
Richard D. Sisson, Worcester, MA (US)

(73) Assignee: GM Global Technology Operations LLC, Detroit, MI (US)

( * ) Notice: Subject to any disclaimer, the term of this patent is extended or adjusted under 35 U.S.C. 154(b) by 366 days.

(21) Appl. No.: 12/589,351

(22) Filed: Oct. 22, 2009

(65) Prior Publication Data

US 2011/0098989 A1    Apr. 28, 2011

(51) Int. Cl.
*G06G 7/56* (2006.01)
*G06G 7/48* (2006.01)
*G06F 17/10* (2006.01)

(52) U.S. Cl.
USPC .................................................. 703/6; 703/2

(58) Field of Classification Search ............... 703/6; 700/145–146, 153
See application file for complete search history.

(56) References Cited

U.S. PATENT DOCUMENTS

| 7,024,342 B1* | 4/2006 | Waite et al. ..................... 703/6 |
| 2006/0282186 A1* | 12/2006 | Hansen et al. ................. 700/97 |
| 2009/0216347 A1* | 8/2009 | Mahfouf et al. ............... 700/31 |
| 2009/0320963 A1* | 12/2009 | Wang ........................... 148/415 |
| 2010/0292966 A1* | 11/2010 | Wang et al. ..................... 703/2 |
| 2010/0292970 A1* | 11/2010 | Brincat et al. .................. 703/6 |

OTHER PUBLICATIONS

Varde et al. "Estimating Heat Transfer Coefficients as a Function of Temperature by Data Mining", Nov. 20, 2005, 10 pages.*
Google books search result "estimating heat transfer coeeficients as a function of temperature by data mining", search performed on Mar. 20, 2012, Title pages, 2 pages.*
Google books search result "estimating heat transfer coeeficients as a function of temperature by data mining", search performed on Mar. 20, 2012, p. x.*

* cited by examiner

*Primary Examiner* — Suzanne Lo
(74) *Attorney, Agent, or Firm* — Dinsmore & Shohl LLP

(57) ABSTRACT

A method to predict heat transfer coefficients for metal castings during quenching and/or cooling is provided. First, an initial set of HTC data are obtained from the computational fluid dynamics (CFD) simulation based on the metal casting geometry, initial metal casting temperature (distribution), quench bed/tunnel dimensions and set-up, and a given or baseline (standard) quenching condition including, but not limited to, air and/or gas flow velocity, air and/or gas flow direction relative to the work piece, air and/or gas temperature, air and/or gas humidity, etc. The initial HTC values for the entire surface of the work piece calculated from CFD can then be optimized by multiplying scale factors to minimize the error between the predicted temperature-time profiles and the experimental measurements for the given or standard/baseline quench condition. When the HTC values are optimized for a standard/baseline quench condition, a set of semi-empirical equations (or weight functions) can be used to quickly modify the standard/baseline HTC data for different quenching conditions (i.e., variations of quenching conditions from the baseline) without performing complete heat transferring and optimization calculations. A system and article of manufacture are also provided.

17 Claims, 8 Drawing Sheets

SYSTEMS AND METHODS FOR PREDICTING HEAT TRANSFER COEFFICIENTS DURING QUENCHING

BACKGROUND

The present invention relates generally to the heat treatment of metals and alloys, including aluminum alloy castings. More particularly, the invention relates to systems, methods, and articles of manufacture to predict the heat transfer coefficient in air and/or gas quenched castings after solution treatment.

The increasing demand of reducing weight and improving fuel efficiency has lead to the use of cast aluminum alloys in critical automotive components such as engine blocks, cylinder heads, and suspension parts. To improve mechanical properties, the aluminum castings are usually subject to a full T6/T7 heat treatment, which includes a solution treatment at a relatively high temperature, quench in a cold medium such as water or forced air, then age hardening at an intermediate temperature. A significant amount of residual stresses can be developed in aluminum castings during the quenching process. The existence of residual stresses, in particular tensile residual stresses, can have a significant detrimental influence on the performance of a structural component. In many cases, the high tensile residual stresses can result in a severe distortion of the component, and they can even cause cracking during quenching or subsequent manufacturing processes.

The amount of residual stresses produced in cast aluminum components during quenching depends on the quenching rate and the extent of non-uniformity of the temperature distribution in the entire casting. A rapid quenching, such as water quenching, can produce a significant amount of tensile residual stresses, particularly in a complex aluminum component with different wall thicknesses. Consequently, air quenching has been used increasingly in the heat treatment of cast aluminum components. Compared to water quenching, air quenching can control the quenching rate more uniformly so that the residual stresses and distortion can be minimized.

Heat transfer of a hot metal work piece during air and/or gas quenching is dependent on the heat transfer coefficient (HTC) at the interface between the hot metal object and the quenching air and/or gases. The use of accurate HTC boundary conditions during the computational simulation is needed for reliable prediction of the material behavior during quenching. However, experimental determination of the HTC boundary condition during quenching is not only costly, but also difficult, particularly for a work piece with a complex geometry. As a result, a uniform and constant HTC boundary condition is often assumed in the quenching simulation. This can result in a significant error between the simulation and the actual measurements.

Therefore, there is a need for a method of predicting the distribution of heat transfer coefficients of the entire heat transfer interfaces between the hot metal object and the quenching media.

SUMMARY

These problems are solved with the system, method, and article of manufacture provided. First, an initial set of node-based HTC data are obtained from the computational fluid dynamics (CFD) simulation based on the work piece geometry, quench bed/tunnel set-up (geometry), initial work piece temperature (distribution) prior to quench, and a given or baseline quenching condition including, but not limited to, air and/or gas flow velocity, air and/or gas flow direction relative to the work piece, air and/or gas temperature, air and/or gas humidity, etc. The initial HTC values for the entire surface of the work piece calculated from the CFD are then optimized by multiplying scale factors to minimize the error between the predicted temperature-time profiles and the experimental measurements for the given or baseline quenching condition. When the HTC values are optimized for a baseline quench condition, a set of semi-empirical equations (or weight functions) can then be used to quickly modify the optimized baseline HTC data for different quenching conditions (i.e., variations of quenching conditions from the baseline) without performing complete heat transferring and optimization calculations.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following detailed description of specific embodiments can be best understood when read in conjunction with the following drawings, where like structure is indicated with like reference numerals and in which.

Figure 1A:
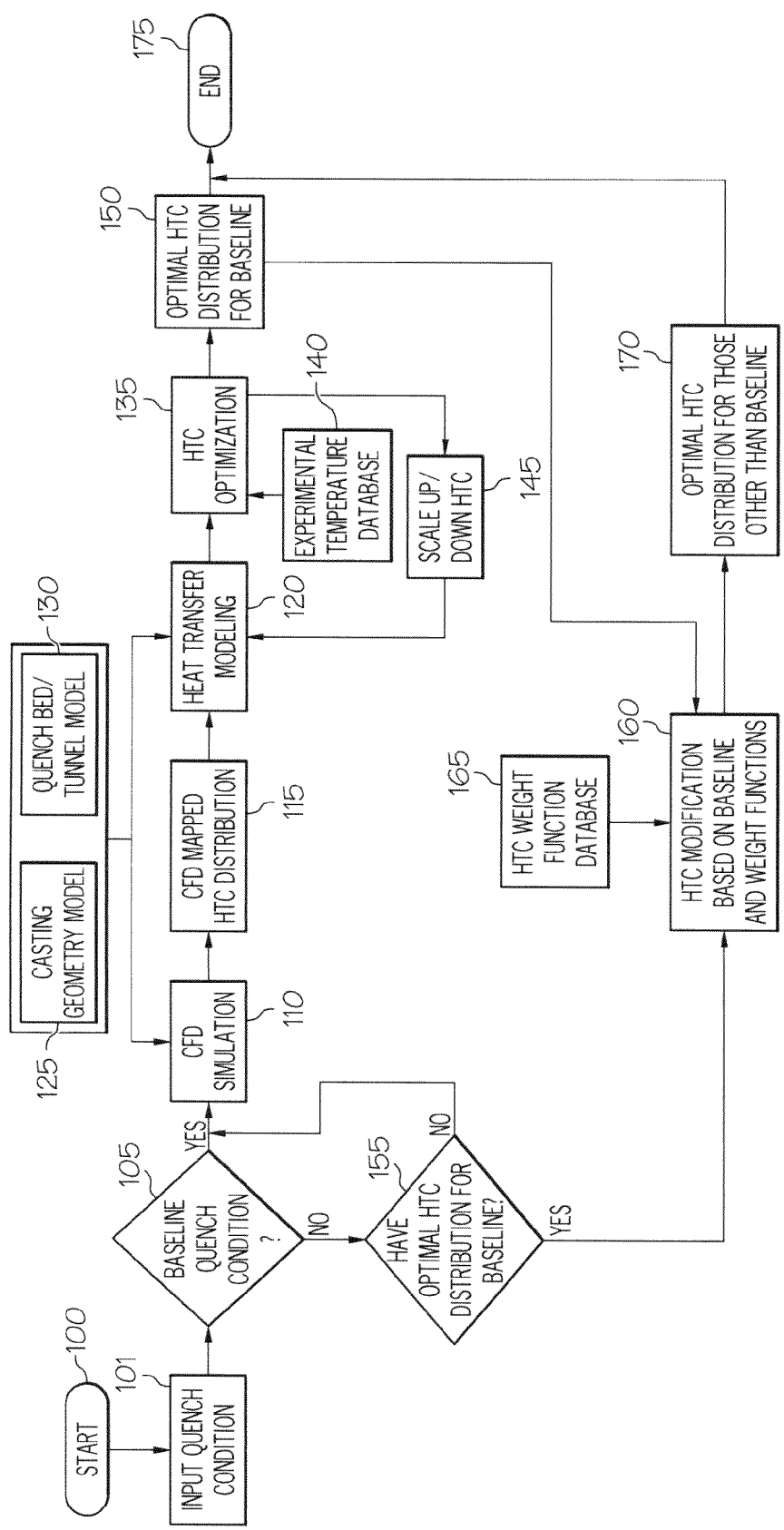
FIG. 1A is a flow chart showing the procedure for accurately estimating the HTC distribution according to one embodiment of the present invention.

The embodiments set forth in the drawings are illustrative in nature and are not intended to be limiting of the embodiments defined by the claims. Moreover, individual aspects of the drawings and the embodiments will be more fully apparent and understood in view of the detailed description that follows.

DETAILED DESCRIPTION

After solution heat treatment, hot metal work pieces are usually quenched at a controlled cooling rate for better mechanical properties. Experimental and numerical simulation results show that the HTC between the hot metal object and the quench media, such as air and/or gas, plays an important role in affecting quenching results such as distortion, residual stress, and final mechanical properties. In order to predict the residual stress, distortion, and mechanical properties of quenched metal objects accurately, it is desirable to obtain accurate HTC data with respect to different air and/or gas quenching process conditions.

New methods, systems, and articles of manufacture were developed to obtain accurate HTC data for different work pieces at different quenching conditions. First, an initial set of HTC data are obtained from a CFD simulation based on the work piece geometry and its initial temperature (distribution), quench bed/tunnel set-up (geometry), and a given or baseline quenching condition including, but not limited to, air and/or gas flow velocity, air and/or gas flow direction relative to the work piece, air and/or gas temperature, air and/or gas humidity, etc. The initially calculated HTC distribution for the entire surface of the work piece from the CFD simulation can then be optimized by multiplying scale factors so that the predicted temperature-time profiles match the experimental measurements for the given or baseline quench condition (within an acceptable tolerance). When the HTC values are optimized for a baseline quench condition, a set of semi-empirical equations (weight functions) can then be used to quickly modify the optimized baseline HTC data for different quenching conditions (i.e., variations of quenching conditions from the baseline) without performing complete heat transferring and optimization calculations.

The methods, systems, and articles of manufacture allow accurate prediction of the distribution of heat transfer coefficients for at least, but not limited to, air and/or gas quenching, so that the heat transfer during air and/or gas quenching can be accurately simulated, and the resultant properties of the quenched objects, such as distortion and residual stresses, can be estimated. In addition, they provide the opportunity to optimize the HTC data, and thus to reduce residual stresses through a quenching process optimization. They also eliminate tedious experimental measurements of heat transfer coefficients, saving both time and money.

The method includes two basic procedures and an optional third procedure: (1) an initial set of HTC data is obtained from the CFD simulation on the basis of work piece geometry, quench bed/tunnel set-up (geometry), initial work piece temperature (distribution) prior to quench, and a given or baseline quenching condition including, but not limit to, air and/or gas flow direction relative to work piece, air and/or gas flow velocity, air and/or gas temperature and humidity, etc; (2) the initially calculated HTC data from CFD simulation is optimized with scale factor(s) to match the actual temperature profile during quenching of a given or baseline condition; and optionally (3) when the HTC values are optimized for a baseline quench condition, various weight functions are used to quickly modify the HTC data for different quenching conditions other than baseline without performing complete heat transferring and optimization calculations.

FIG. 1A is a flow chart summarizing one embodiment of the process. The process begins at block 100 and inputs a quench condition 101. At decision block 105, the system determines if the inputted quench condition is a baseline quench condition. If it is, the CFD simulation is performed at block 110 and provides the CFD mapped HTC distribution at block 115. The heat transfer modeling takes place at block 120. The CFD simulation 110 and heat transfer modeling 120 utilize information on the casting geometry model from block 125 and the quench bed/tunnel model from block 130, as well as initial work piece temperature (distribution) prior to quench and the standard quench condition 101 including, but not limited to, air and/or gas flow direction relative to work piece, air and/or gas flow velocity, air and/or gas temperature and humidity, etc. The initial set of HTC data for the heat transfer modeling 120 is provided by the CFD simulation 110 through the CFD mapped HTC distribution 115. The optimization follows at block 135 (as described further below), which utilizes the experimental temperature database of block 140 and compares the simulated temperature distributions from heat transfer modeling 120 with the experimental temperature measurements 140. During iterative HTC optimization, the HTC distribution for heat transfer modeling 120 can be scaled up or down using the scale factor 145 to reduce the error between the simulated temperature distributions from heat transfer modeling 120 and the experimental temperature measurements 140. The optimal HTC distribution is generated for the baseline quench condition at block 150 when the difference between the simulated temperature distributions from heat transfer modeling 120 and the experimental temperature measurements 140 is minimized and/or within the allowed tolerance, and the process ends at block 175.

If the quenching condition was determined not to be a baseline quench condition at decision block 105, then at decision block 155, the system determines if there is an optimal HTC distribution for the baseline quenching condition. If the optimal HTC distribution for the baseline quenching condition is not available in the database, the system will proceed with the procedure as described above. If an optimal HTC distribution for the baseline condition is available, the system proceeds to the HTC weight function module at block 160, which calculates the HTC distribution for the specified quench condition at block 170 using the HTC weight function database from block 165 and the optimal HTC distribution for the baseline quench condition from block 150. The weight function database is normally developed based on the well-controlled quench conditions including air and/or gas flow direction relative to work piece, air and/or gas flow velocity, air and/or gas temperature and humidity, etc. The process ends at block 175 when the optimal HTC distribution is obtained for the quench condition that is not baseline quench condition.

Figure 1B:
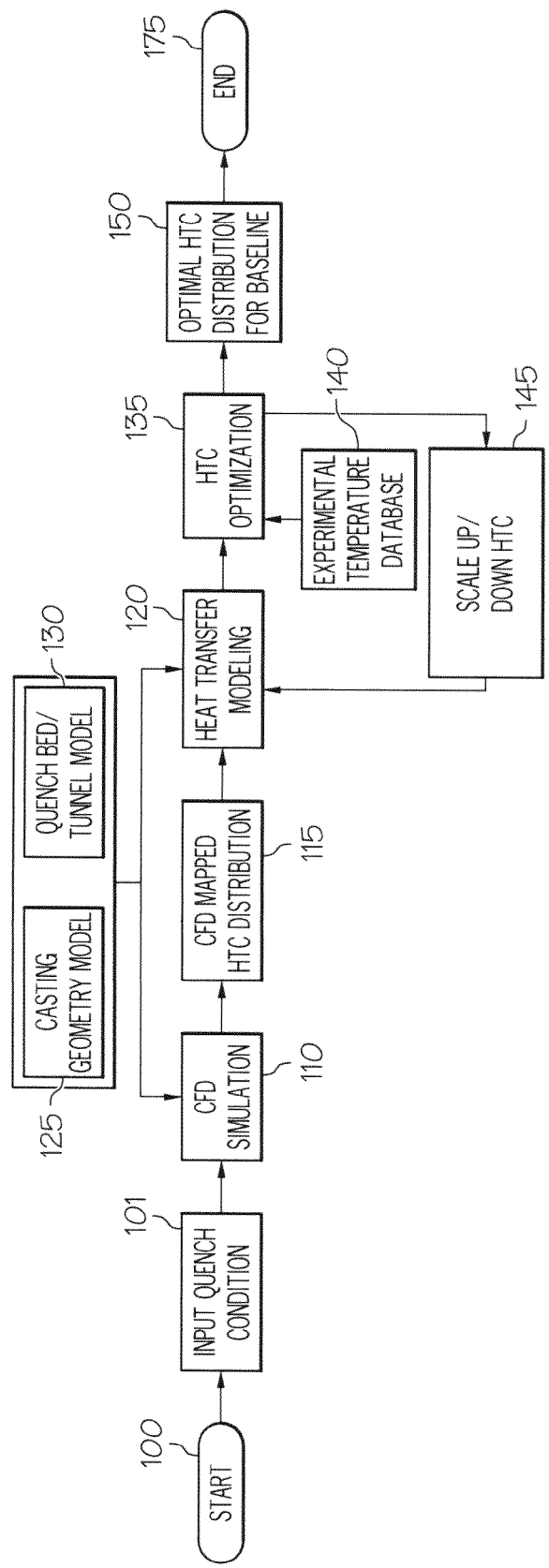
FIG. 1B is a flow chart showing the procedure for accurately estimating the HTC distribution according to another embodiment of the present invention.

In an alternate embodiment shown in FIG. 1B, the system uses the heat transfer modeling and optimization to obtain the optimal HTC for a given quench condition without distinguishing whether the quench condition is a baseline quench condition or not. This approach can be used if there is experimental temperature data for the quench condition available for comparison. In practice, the baseline for a certain part or process is often not known. But, there may be temperature measurement data for a given quench condition. In this case, the alternate method will provide the solution. Thus, the alternate method is more general.

The process begins at block 100 and inputs the quench condition at block 101. The CFD simulation is performed at block 110 and provides the CFD mapped HTC distribution at block 115. The heat transfer modeling takes place at block 120. The CFD simulation 110 and heat transfer modeling 120 utilize information on the casting geometry model from block 125 and the quench bed/tunnel model from block 130, as well as initial work piece temperature (distribution) prior to quench and the quench conditions from block 101. The optimization follows at block 135 (as described further below), which utilizes the experimental temperature database of block 140 and compares the simulated temperature distributions from heat transfer modeling 120 with the experimental temperature measurements 140. During iterative HTC optimization, the HTC distribution for the quench condition is modified using the scale factor(s) at block 145. The difference between the simulated temperature distributions from heat transfer modeling 120 and the experimental temperature measurements 140 is minimized and/or within the allowed tolerance to obtain the optimal HTC distribution for the quench condition at block 150. The process ends at block 175.

Figure 2:
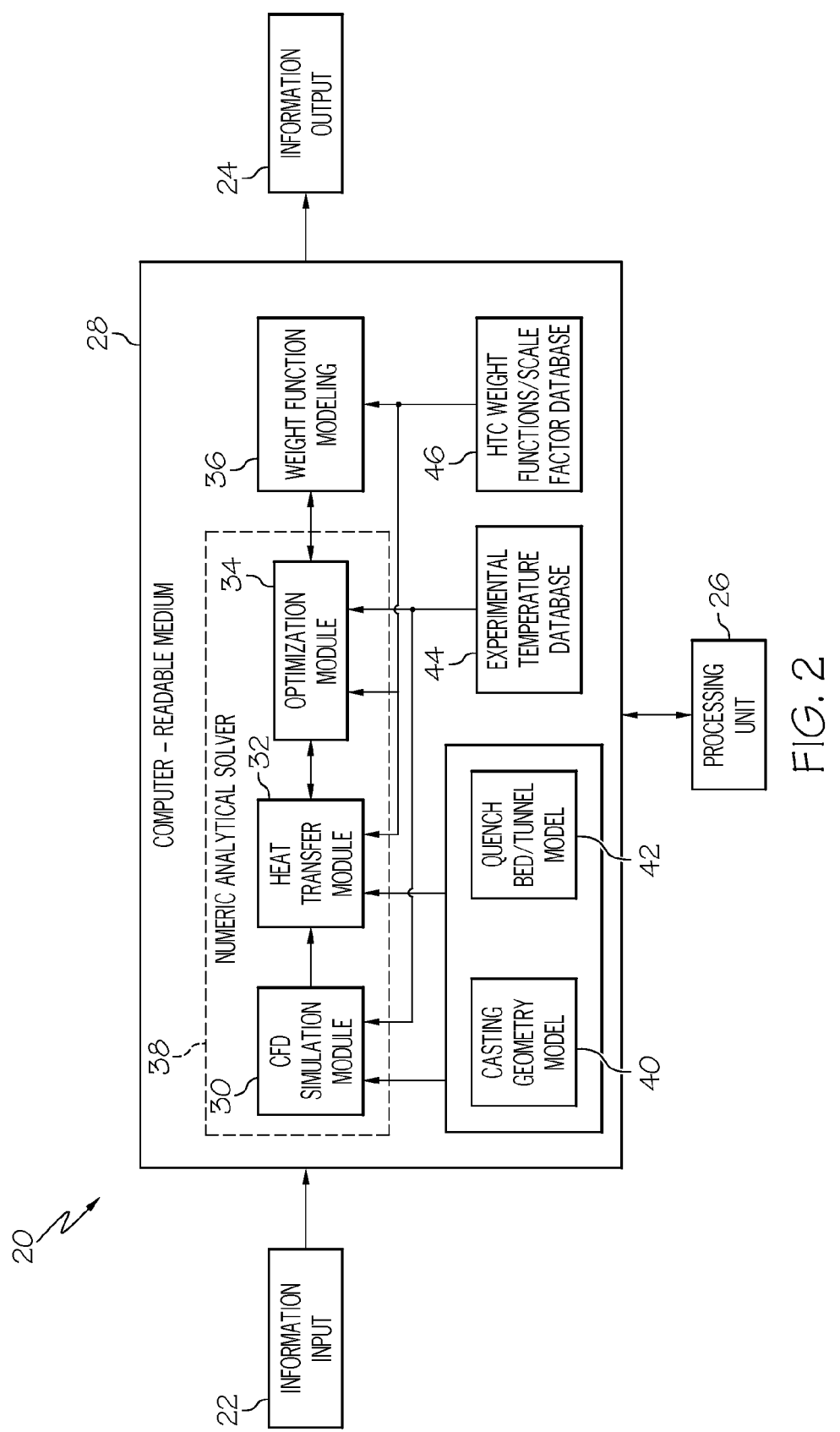
FIG. 2 illustrates a system to predict heat transfer coefficients in an aluminum casting during quenching according to another embodiment of the present invention.

In one embodiment, shown in FIG. 2, a system 20 may predict the HTC distribution of a work piece. The system 20 comprises an information input 22, an information output 24, a processing unit 26, and a computer-readable medium 28. The information input 22 is configured to receive the information relating to the casting (work piece), such as one or more of part geometry, the material the part is made of, the quench bed/tunnel set-up, the air and/or gas flow rate, the air and/or gas flow direction relative to the work piece (casting), the air and/or gas temperature and humidity, and the initial temperature (distribution) of the part. The information output 24 is configured to convey information relating to the HTC distribution predicted by the system. The computer-readable medium 28 comprises a computer readable program code embodied therein, the computer readable program code comprising a computational fluid dynamics (CFD) simulation module 30, a heat transfer modeling module 32, an optimization module 34, and HTC weight function modeling module 36. Further, the computer-readable medium may comprise a numeric analytical solver 38. The numeric analytical solver 38 can be a finite element or finite difference analysis based heat transfer code, or a volume of fluid based heat transfer code. The numeric analytical solver 38 may comprise at least one of the CFD simulation module, the heat transfer modeling module, and the optimization module, and be cooperatively coupled with any of the CFD simulation module, heat transfer modeling module, and optimization module. The CFD simulation module and the heat transfer modeling module utilize information from the casting geometry model 40 and the quench bed/tunnel 42. The experimental temperature database 44 provides information to the CFD simulation module 32 and the optimization module 34. The processing unit 26 is in communication with, and processes the calculations and other data of, the computer-readable medium 28 to predict the HTC distribution of the work piece.

Although the following example refers to aluminum castings, the same process would apply for other materials, such as metals and alloys of metals, as would be understood by those of skill in the art. Examples of suitable materials include, but are not limited to, aluminum, magnesium, steel, and their alloys.

1) CFD Simulation Module

Figure 3:
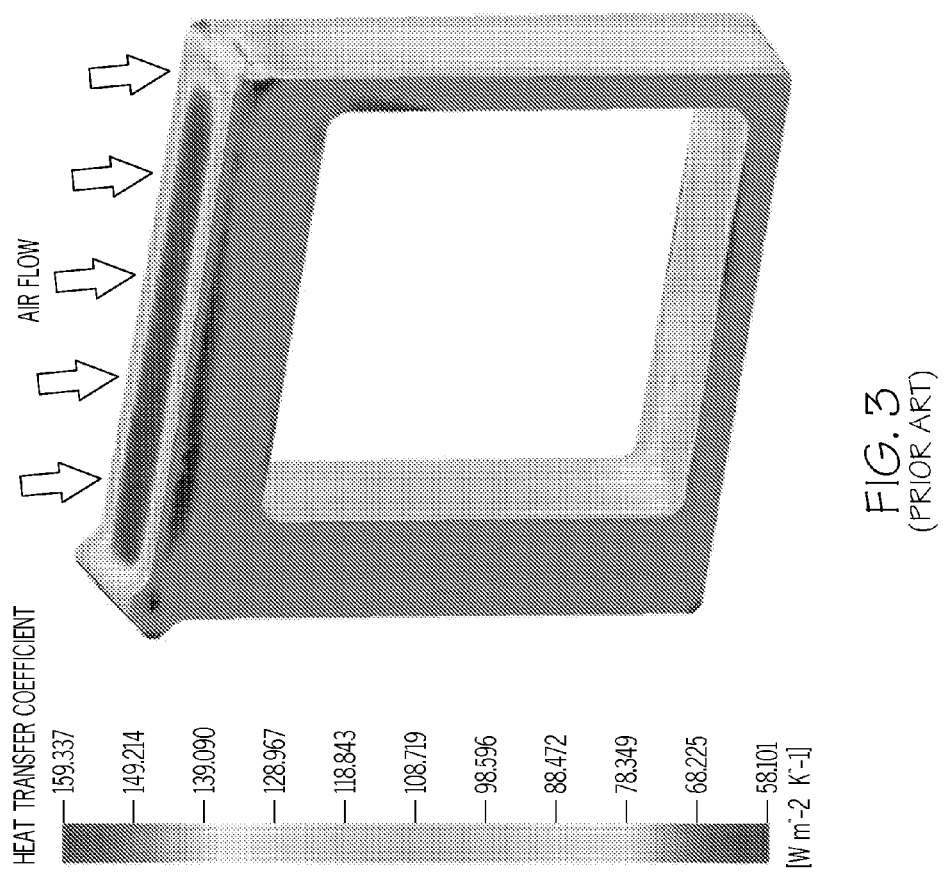
FIG. 3 is an illustration of the HTC distribution predicted by a CFD package.

Commercially available CFD software, such as fluent and CFX both from Ansys Corp., STAR-CD and STAR-CCM+ from CD-Adapco, Flow-3D from Flow Science, and WRAFTS from Flow Logic, etc., can solve thermal and fluid problems to a certain degree of accuracy. In an air and/or gas quenching process, turbulent flow models are applied to simulate the flow velocities. Conjugated heat transfer assumptions are made so that the heat fluxes in the air/gas and the work piece are equal at the interface. Thermal radiation effect is included in the simulation due to high temperature of the work piece. Air or gas material properties, such as the specific heat, thermal conductivity, density, etc., are treated as functions of temperature, and initial conditions and boundary conditions are set to correspond to actual process conditions, so that the temperature and flow evolution and distribution of the air and/or gas and the work piece can be obtained, as well as the HTC data. CFD simulation can provide a node-based HTC distribution for the entire surface of the work piece, as shown in FIG. 3. In general, the node-based HTC distribution results in more accurate prediction of temperature-time field in the entire work part than zone-based HTC distribution and uniform HTC; therefore, it allows accurate prediction of the residual stress.

In the CFD simulation, the relationship between heat transfer and fluid flow is governed by energy conservation equations that are incorporated in the CFD software, in which some coefficients or parameters such as radiation coefficient and turbulent parameter, etc. are however estimated based on experience. In addition, ideal boundary conditions are chosen for the simulation. However, often the estimated values do not correspond to the experimental values. Because of the theoretical simplification, numerous assumptions, and approximated boundary conditions during the numerical calculations in CFD, the calculated HTC data and temperature profile of the work piece can be significantly different from the actual measurements, particularly for complex geometry and quenching conditions.

Figure 4:
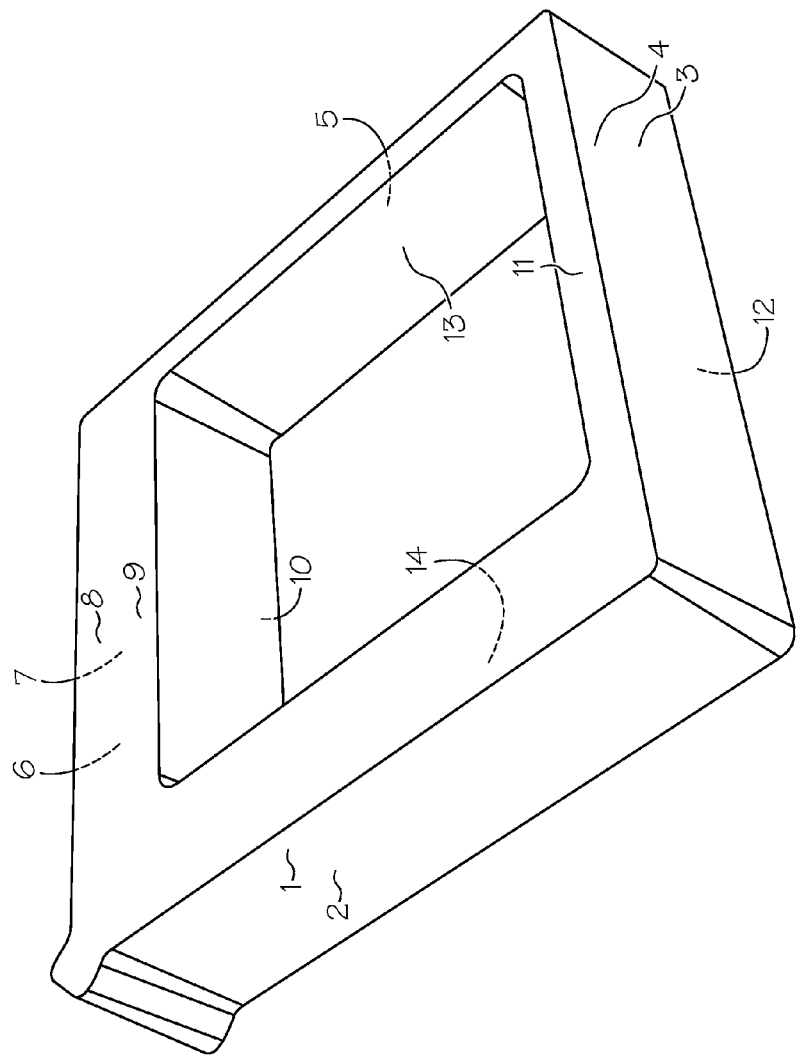
FIG. 4 is a schematic showing the locations of the thermocouples on the test casting.

In order to determine the actual HTC of aluminum castings during an air quench, a mixed wall frame shaped aluminum casting was equipped with 14 thermocouples at various locations, as shown in FIG. 4. In air quenching tests, the aluminum casting with the thermocouples was first heated to a designated solution temperature in the furnace, and then quickly moved out of the furnace (within 15 seconds) and placed onto a fixture which was exposed to the forced air generated by a blower. The cooling curves of the aluminum casting during quenching were acquired using a data acquisition system (such as a data acquisition card and data acquisition software, for example, LabView, available from National Instruments Corp. Other suitable data acquisition systems and software can be used). The forced air temperature, air humidity, air pressure, and air velocity were also recorded for each test. The measured thermocouple data (temperature vs. time) was stored in a database for use in the heat transfer modeling and optimization processes.

To develop a complete database of heat transfer coefficients for the air quenched aluminum casting, different quench orientations (vertical, horizontal, and diagonal with respect to air flow direction) were tested, as well as different process conditions, such as air and/or gas temperature, humidity, and velocity. For example, the air temperature was changed from 25° C. to 40° C., the humidity was changed from 17% to 50%, and the velocity from 0 to 18 m/sec. The details for the quench condition variation can be seen in Table 1. Suitable sets of experimental conditions can be developed based on the particular application in order to obtain the database of heat transfer coefficients.

TABLE 1

A variety of quench conditions tested with the mixed wall frame shaped aluminum casting.

| | Factors | | | |
|---|---|---|---|---|
| | Air Temperature (° C.) | Air relative humidity | Air velocity (m/s) | Test casting/probe orientation (degree) |
| Levels | 15 | 17% | 0 | 0 |
| | 25 | 23% | 4.8 | 20 |
| | 40 | 30% | 7.5 | 45 |
| | | 50% | 10.5 | 70 |
| | | | 13.7 | 90 |
| | | | 18 | |

Figure 5:
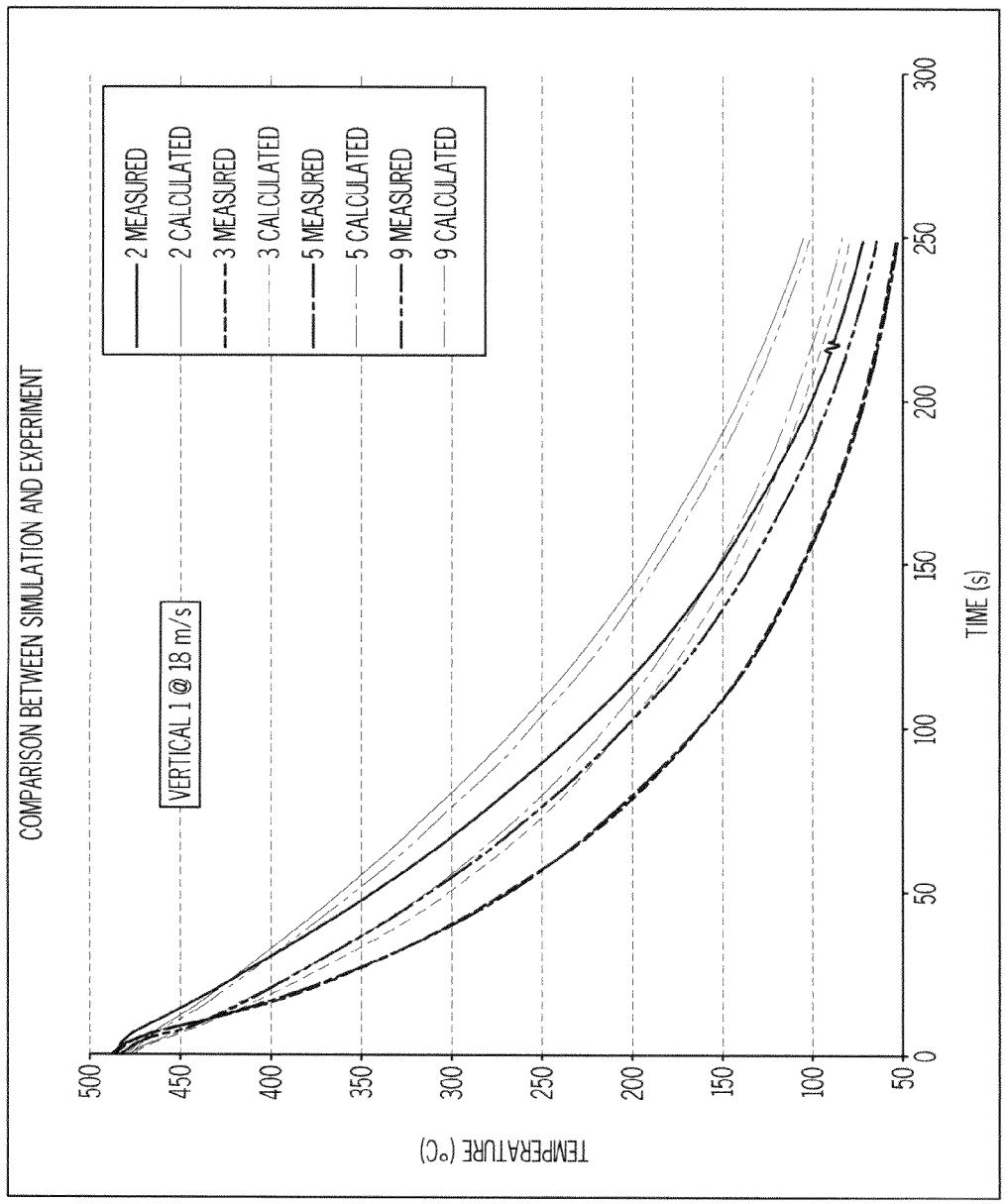
FIG. 5 is a graph showing a comparison between the simulated temperature using the initially determined HTC data from CFD and the experimental temperature for four thermocouples on the test casting.

For simplification, the temperatures from four thermocouples on four different walls (legs) of the mixed wall frame shaped aluminum casting were selected for comparison. FIG. 5 compares the CFD calculated temperature distributions at the four locations with the actual temperature measurements at those locations. There is a significant difference between the CFD calculated temperatures and the measured temperatures, particularly for the low temperatures. The variation indicates that the HTC data calculated from the initial CFD simulation is not optimal. The HTC data can be optimized in the next step.

2) Heat Transfer Modeling Module and Optimization Module

To further optimize the heat transfer coefficients on the surfaces of the aluminum casting so that the calculated temperature distribution matches the measured cooling curves, a transient thermal simulation (heat transfer modeling) needs to be done. This can be conducted using in-house developed or commercially available FEA (finite element analysis), FDA (finite difference analysis) based code, or VOF (volume of fluid) based code. Suitable commercial available FEA code includes ABAQUS (Dassault Systemes), Ansys (Ansys, Inc), WRAFTS (Flow Logic), EKK (EKK, Inc), and ProCAST (ESI Corp) etc. Suitable commercial available FDA code includes MagmaSoft (MAGMA Gieβereitechnologie GmbH), etc. Suitable commercially available VOF code includes Flow-3D (Flow Science), and WRAFTS (Flow Logic). As an example, the CFD predicted HTC data/distribution is optimized iteratively using an FEA package (such as ABAQUS). The CFD calculated HTC distribution is mapped to ABAQUS as an initial boundary condition, and the ABAQUS transient heat transfer simulation is performed to obtain the temperature-time profile. The calculated temperature profile at given locations is compared to actual experimental temperature curves. If there is a temperature difference, the HTC distribution at the boundaries is scaled up or down to reduce the difference. This procedure is repeated until the difference is within the acceptable tolerance, for example, less than 5° C. The tolerance can be selected based on the application, material, temperature, etc. Generally, the tolerance is less than about 20° C., or less than about 10° C., or less than about 5° C.

The scale factor for the optimization can vary with casting temperature, quench time, work piece geometry, quenching orientation, etc. The scale factors are generated by the optimization program. As an example, a temperature-dependent scale factor for the vertical orientation of the picture frame shaped aluminum casting of FIG. 4 is tabulated in Table 2. More accurate results can be obtained by making the temperature ranges smaller.

TABLE 2

A sample scale factor at varying temperatures

| Temperature range | Scale factor |
|---|---|
| 400-500 | 1.4629 |
| 200-400 | 1.4176 |
| 70-200 | 1.4118 |

The optimization process can be controlled by commercially available software (such as iSIGHT from Dassault Systemes, Frontier from Efficient Frontier, etc) or by a user self-defined script program. During iterative computational trial and comparison, the optimization software or the user-defined optimization script uses an optimization method to adjust the HTC dataset and then calls the FEA package to do the heat transfer simulation. After the heat transfer calculation is completed each time, the optimization software or the user-defined optimization script compares the difference between the calculated temperatures and the measurements and decides whether the iteration process continues.

Figure 6:
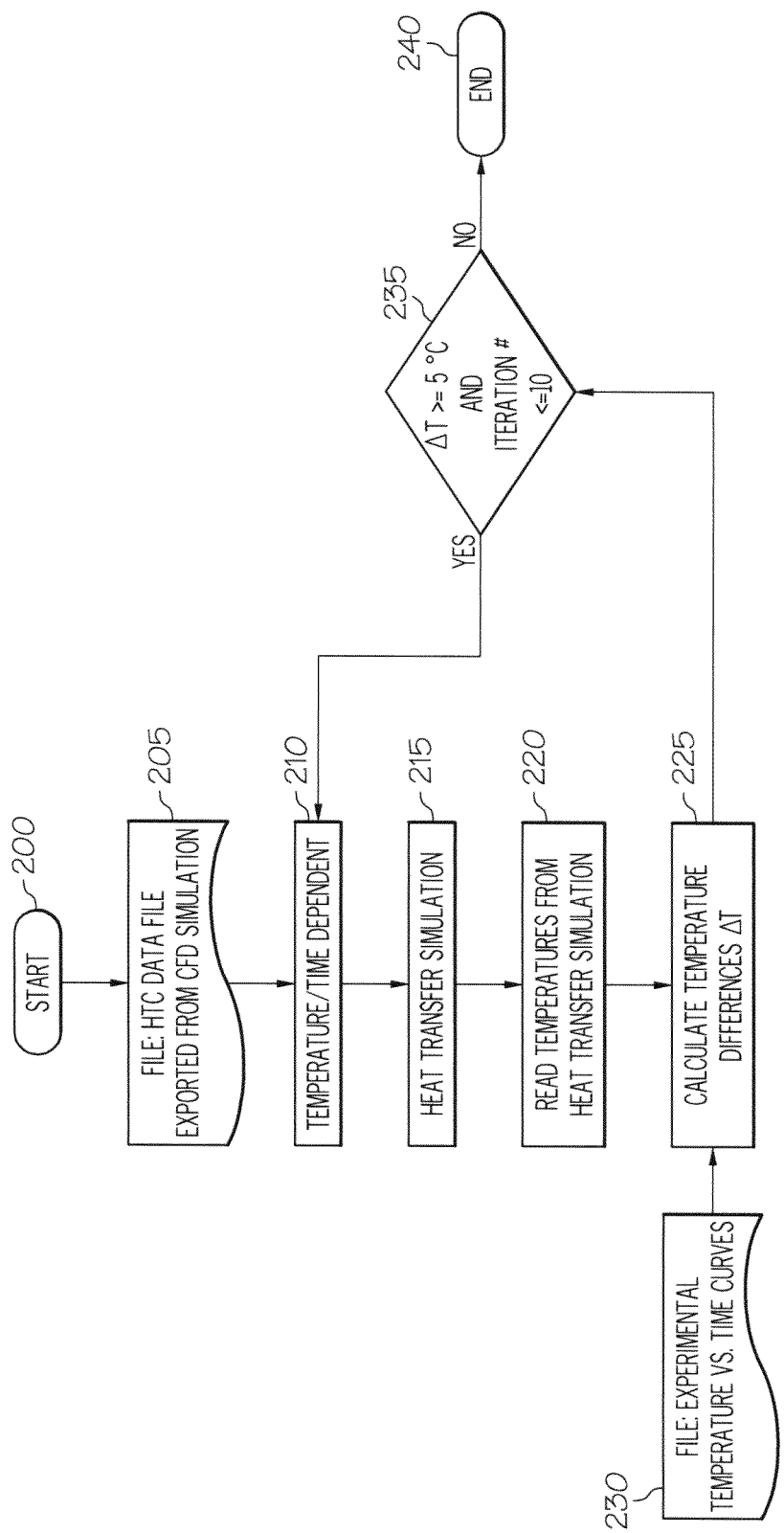
FIG. 6 is a flow chart showing the procedure for optimizing the HTC distribution.

FIG. 6 shows a typical flow chart for the FEA optimization analysis in ABAQUS. The optimization process is started in block 200. In block 205, the HTC data file is exported from the CFD simulation. In block 210, a scale factor is selected, followed by a thermal simulation (heat transfer modeling) in block 215. The temperature is read from the ABAQUS results in block 220. In block 225, the ABAQUS temperature results from block 220 are compared with the experimental temperature v. time curves from block 230. In block 235, the temperature difference and iteration number are compared to preset conditions, e.g., is the temperature difference greater than or equal to 5° C., and is the iteration number less than or equal to 10. The preset conditions can be set as desired. If the conditions are met, the process returns to block 210 and modifies the scale factor. If the conditions are not met, the process ends at block 240.

Figure 7:
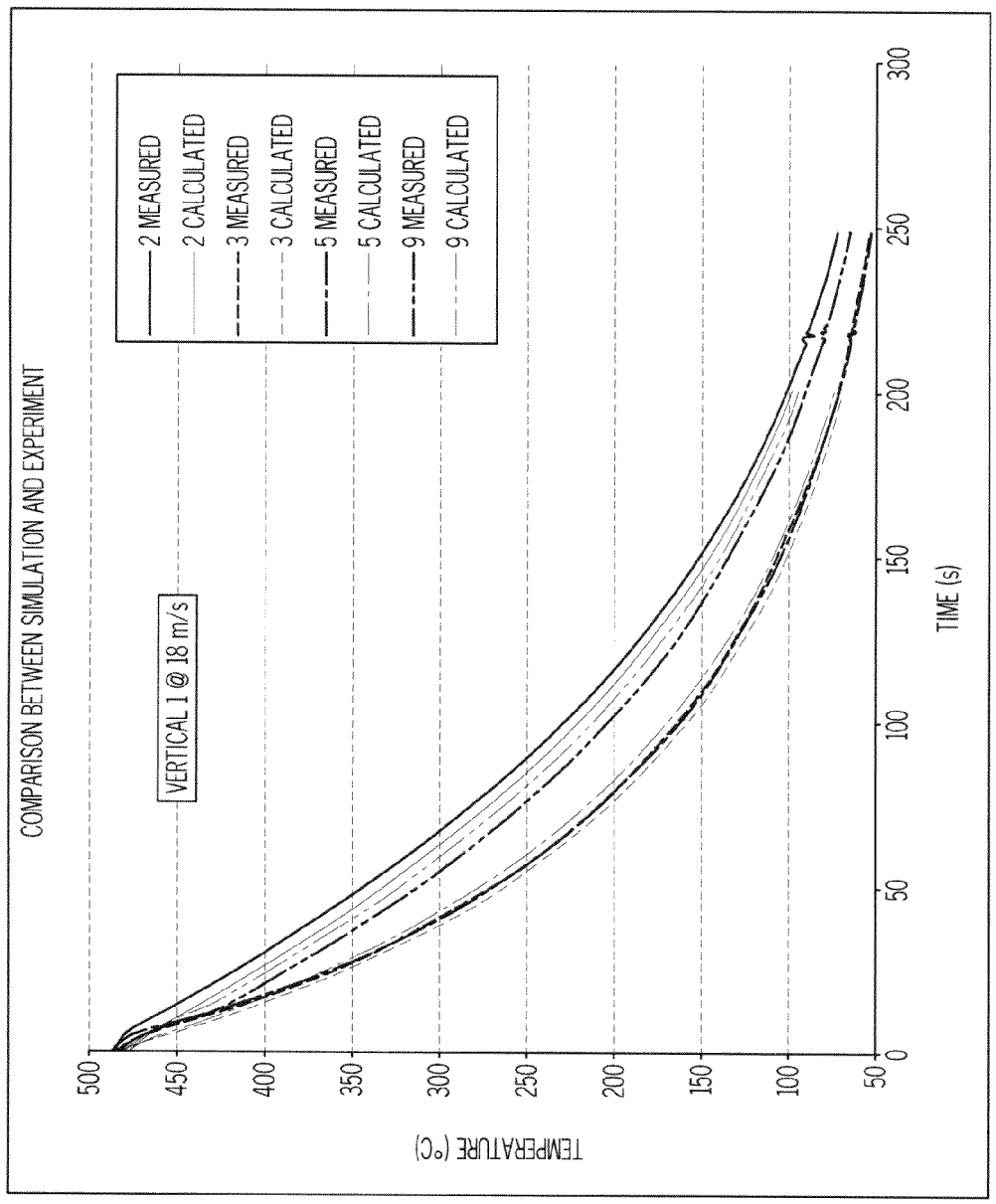
FIG. 7 is a graph showing a comparison between the simulated temperature using the optimized HTC data and the experimental temperature for four thermocouples on the test casting after optimization.

FIG. 7 compares the calculated temperature distributions after optimization with the experimental measurements for several locations in the test casting. With the optimized HTC dataset, the calculated temperature distributions are almost identical to the actual measurements.

3) HTC Weight Function Modeling and Database

Using the above procedure, an accurate HTC distribution can be obtained for a given casting geometry and baseline quenching condition. When there is a small change and/or variation in quenching conditions with respect to the baseline, however, the HTC distribution needs to be changed accordingly. In this case, the HTC distribution/dataset from the baseline calculations can be modified using a set of weight functions to accommodate the small variation/change of the quenching conditions so that a tedious heat transferring and optimization process as described in section 2) can be avoided. Equation (1) is an example of the weighted HTC for air and/or gas quenching.

$$HTC = K_1 K_2 K_3 \ldots K_n \cdot HTC_0 \quad (1)$$

where, $HTC_0$=the standard HTC at a baseline condition, unit in $W/m^2 K$.

$K_1, K_2, K_3, \ldots, K_n$=modification factors.

The coefficients in these semi-empirical equations can be calibrated from the quenching experiments (as shown in Table 1) used to provide the HTC database. Using these weight functions, the influence of each factor is governed so that the change of HTC can be estimated when one or more quenching parameters change. For a work piece with complicated geometry, the HTC distribution can be scaled up or down in the same manner.

One example set of modification factors for air quenching is tabulated in Table 3.

TABLE 3

One sample modification factors at varying temperatures

| Influencing factors | Meanings | Values |
|---|---|---|
| $HTC_0$ | Standard HTC | 110 $W/m^2$ K at 1 atm, 10 m/s, 25° C. and vertical |
| $K_1$ | Velocity | $K_{velocity} = A \times \left(\dfrac{Vel}{Vel_o}\right) + B$ |

TABLE 3-continued

One sample modification factors at varying temperatures

| Influencing factors | Meanings | Values |
|---|---|---|
| $K_2$ | orientation | $A = 0.57; B = 0.41$ <br> $K_{orientation} = C \times \left(\dfrac{Angle}{Angle_o = 90}\right)^2 + D \times \left(\dfrac{Angle}{Angle_o = 90}\right) + E$ <br> $C = 0.6933; D = 0.7882; E = 0.906$ |
| $K_3$ | Air temperature | 1 for the range from 15C to 30C |
| $K_4$ | humidity | 1 |
| $K_5$ | Surface quality | 1 for as casted and machined |
| $K_6$ | material | 1 for aluminum alloy casting |

With this procedure, an accurate HTC dataset can be obtained for different work piece geometries and quenching conditions with minimal requirements in experiments, CFD and FEA simulations, and optimization.

It is noted that while the majority of the description provided herein is specific to an embodiment of the present invention relating to a system to predict at least one of a HTC distribution of a quenched aluminum casting, the same description applies equally consistently to other embodiments of the present invention relating to methods and articles of manufacture to predict the HTC distribution of a quenched aluminum casting, as well as other metals and alloys.

Further, it is noted that recitations herein of a component of an embodiment being "configured" in a particular way or to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural factors of the component.

It is noted that terms like "generally," "commonly," and "typically," when utilized herein, are not utilized to limit the scope of the claimed embodiments or to imply that certain features are critical, essential, or even important to the structure or function of the claimed embodiments. Rather, these terms are merely intended to identify particular aspects of an embodiment or to emphasize alternative or additional features that may or may not be utilized in a particular embodiment.

For the purposes of describing and defining embodiments herein it is noted that the terms "substantially," "significantly," and "approximately" are utilized herein to represent the inherent degree of uncertainty that may be attributed to any quantitative comparison, value, measurement, or other representation. The terms "substantially," "significantly," and "approximately" are also utilized herein to represent the degree by which a quantitative representation may vary from a stated reference without resulting in a change in the basic function of the subject matter at issue.

Having described embodiments of the present invention in detail, and by reference to specific embodiments thereof, it will be apparent that modifications and variations are possible without departing from the scope of the embodiments defined in the appended claims. More specifically, although some aspects of embodiments of the present invention are identified herein as preferred or particularly advantageous, it is contemplated that the embodiments of the present invention are not necessarily limited to these preferred aspects.

What is claimed is:

1. A system to automatically predict a distribution of heat transfer coefficients of a casting during a quenching process, the system comprising:

an information input configured to receive information relating to at least one of a defined quenching process, a defined casting quenched via the defined quenching process, a distribution of heat transfer coefficients of the defined casting obtained during the defined quenching process, and a temperature-time profile of the defined casting;

an information output configured to convey information relating to the heat transfer coefficient distribution of the casting predicted by the system;

a processing unit; and a non-transitory computer-readable medium comprising a computer-readable program code embodied therein, the computer-readable medium cooperative with the processing unit, the information input, and the information output such that the information input operated upon by the processing unit and computer-readable program code is presented to the information output as the distribution of heat transfer coefficients of the casting, automatically predicted by the system, the computer-readable program code comprising a simulation module, a heat transfer modeling module, an optimization module, and a weight function modeling module:

wherein the simulation module simulates a quenching process replicating the defined quenching process, and a virtual casting replicating the defined casting to determine a distribution of heat-transfer coefficients for the virtual casting, wherein the heat transfer modeling module simulates a heat transfer of the virtual casting with the determined heat transfer coefficient distribution to determine a temperature-time profile of the virtual casting, wherein the optimization module:

compares the temperature-time profile of the virtual casting with the temperature-time profile of the casting; and adjusts the determined heat transfer coefficient distribution using a modification factor if a difference between the temperature-time profile of the virtual casting and the temperature-time profile of the casting exceeds a preset condition; and wherein the weight function modeling module adjusts the determined heat transfer coefficient with a modification factor indicative of a modification to the defined quenching process and wherein the weight function modeling module uses an equation expressed as:

$$HTC = K_1 K_2 K_3 \ldots K_n \cdot HTC_0$$

where, $HTC_0$=the standard HTC at a baseline condition, unit in W/m²K;

$K_1, K_2, K_3, \ldots, K_n$=the modification factors, and wherein the modification factors are determined empirically; and wherein the adjusted heat transfer coefficient distribution is predictive of the distribution of heat transfer coefficients for a casting made using the simulated quenching process.

2. The system of claim 1 wherein the computer-readable medium comprises a numeric analytical solver comprising at least one of the simulation module, the heat transfer modeling module, and the optimization module, and is coupled with any of the simulation module, the heat transfer modeling module, and the optimization module not comprising the numeric analytical solver.

3. The system of claim 2 wherein the numeric analytical solver comprises a finite element analysis based heat transfer code, a finite difference analysis based heat transfer code, or volume of fluid based heat transfer code.

4. The system of claim 1 wherein the simulation module comprises computational fluid dynamics software.

5. The system of claim 1 wherein the optimization module comprises a finite element analysis based heat transfer code or a finite difference analysis based heat transfer code, and an optimization code.

6. The system of claim 1 wherein the weight function modeling module uses an equation including a plurality of modification factors.

7. The system of claim 6 wherein the modification factor is determined empirically.

8. The system of claim 1 wherein $HTC_0$=110 W/m²K for a baseline quench condition of 1 atm air at 25° C. blowing to a vertically oriented hot metal piece at a velocity ($Vel_0$) of 10 m/s;

$$K_1 = K_{velocity} = A \times \left(\frac{Vel}{Vel_o}\right) + B,$$

where A=0.57, and B=0.41;

$$K_2 = K_{orientation} = C \times \left(\frac{Angle}{Angle_o = 90}\right)^2 + D \times \left(\frac{Angle}{Angle_o = 90}\right) + E,$$

where C=0.6933, D=0.7882, and E=0.906; $K_3$=1 for the range of 15° C. to 30° C.; $K_4$=1; $K_5$=1 for as casted and machined; and $K_6$=1 for aluminum alloy casting, wherein Vel is the air velocity (m/s), Angle is the angle of air flow to the casting surface, and $Angle_{90}$ is the air flow perpendicular to the casting surface.

9. The system of claim 1 wherein the casting is made of a material selected from metals and alloys of metals.

10. A method of automatically predicting a distribution of heat transfer coefficients of a casting during a quench process comprising:

providing a defined casting quenched using a defined quenching process, a distribution of heat transfer coefficients of the defined casting, and a temperature-time profile of the defined casting;

simulating with a simulated quenching process replicating the defined quenching process a quenching of a virtual casting replicating the defined casting;

automatically calculating a distribution of heat transfer coefficients of the virtual casting derived from the simulated quenching process;

simulating a heat transfer of the virtual casting with the calculated heat transfer coefficient distribution to determine a temperature-time profile of the virtual casting for at least a portion of the simulated quenching process;

comparing the temperature-time profile of the virtual casting with the temperature-time profile of the defined casting;

adjusting the determined heat transfer coefficient distribution using a modification factor if a difference between the temperature-time profile of the virtual casting and the temperature-time profile of the defined casting exceeds a preset condition; and adjusting the determined heat transfer coefficient using a modification factor indicative of a modification to the defined quenching process;

wherein the adjusted calculated heat transfer coefficient distribution is predictive of a distribution of heat transfer coefficients for a casting made using a modified quenching process and wherein the determined heat transfer coefficient is adjusted using an equation expressed as:

$$HTC = K_1 K_2 K_3 \ldots K_n \cdot HTC_0$$

where, $HTC_0$=the standard HTC at a baseline condition, unit in W/m²K;

$K_1, K_2, K_3, \ldots, K_n$=the modification factors, and wherein the modification factors are determined empirically; and setting quenching conditions for the modified quenching process using the adjusted heat transfer distribution.

11. The method of claim 10 wherein the adjusted calculated heat transfer coefficient distribution is node based.

12. The method of claim 10 wherein the determined heat transfer coefficient is adjusted using an equation including a plurality of modification factors.

13. The method of claim 12 wherein the modification factors are determined empirically.

14. The method of claim 10 wherein $HTC_0$=110 W/m²K for a baseline quench condition of 1 atm air at 25° C. blowing to a vertically oriented hot metal piece at a velocity ($Vel_0$) of 10 m/s;

$$K_1 = K_{velocity} = A \times \left(\frac{Vel}{Vel_o}\right) + B,$$

where A=0.57, and B=0.41;

$$K_2 = K_{orientation} = C \times \left(\frac{Angle}{Angle_o = 90}\right)^2 + D \times \left(\frac{Angle}{Angle_o = 90}\right) + E,$$

where C=0.6933, D=0.7882, and E=0.906; $K_3$=1 for the range of 15° C. to 30° C.; $K_4$=1; $K_5$=1 for as casted and machined; and $K_6$=1 for aluminum alloy casting, wherein Vel is the air velocity (m/s), Angle is the angle of air flow to the casting surface, and $Angle_{90}$ is the air flow perpendicular to the casting surface.

15. The method of claim 10 wherein the casting is made of a material selected from metals and alloys of metals.

16. An article of manufacture to automatically predict a distribution of heat transfer coefficients of a casting during a quenching process, the article of manufacture comprising an information input, an information output, and at least one non-transitory computer usable medium, wherein:

the information input is configured to receive information relating to at least one of a defined quenching process, a defined casting quenched via the defined quenching process, a distribution of heat transfer coefficients of the defined casting obtained during the defined quenching process, and a temperature-time profile of the defined casting;

the information output is configured to automatically convey information relating to the heat transfer coefficient distribution of the casting predicted by the article of manufacture;

the computer usable medium comprises computer-readable program code when executed by a processor, performs the step of simulating a quenching process replicating the defined quenching process, and a virtual casting replicating the defined casting to determine a distribution of heat-transfer coefficients for the virtual casting;

the computer usable medium comprises computer-readable program code when executed by a processor, performs the step of simulating a heat transfer of the virtual casting with the determined heat transfer coefficient distribution to determine a temperature-time profile of the virtual casting, and comparing the temperature-time profile of the virtual casting with the temperature-time profile of the casting, and adjusting the determined heat transfer coefficient distribution using a modification factor if a difference between the temperature-time profile of the virtual casting and the temperature-time profile of the casting exceeds a preset condition, and wherein the determined heat transfer coefficient is adjusted using an equation expressed as:

$$HTC = K_1 K_2 K_3 \ldots K_n \cdot HTC_0 \qquad (1)$$

where
$HTC_0$=the standard HTC at a baseline condition, unit in W/m$^2$K;

$K_1, K_2, K_3, \ldots, K_n$=the modification factors, and wherein the modification factors are determined empirically;

the computer usable medium comprises computer-readable program code when executed by a processor, performs the step of adjusting the determined heat transfer coefficient with a modification factor indicative of a modification to the defined quenching process, wherein the adjusted heat transfer coefficient distribution is predictive of the distribution of heat transfer coefficients of the casting modified according to the modification; and the computer usable medium is cooperative with the information input and the information output such that the received information operated upon by the computer-readable program code is presented to the information output as a prediction of the adjusted calculated heat transfer coefficient distribution.

17. The article of claim 16 wherein $HTC_0$=110 W/m$^2$K for a baseline quench condition of 1 atm air at 25° C. blowing to a vertically oriented hot metal piece at a velocity ($Vel_0$) of 10 m/s;

$$K_1 = K_{velocity} = A \times \left(\frac{Vel}{Vel_o}\right) + B,$$

where A=0.57, and B=0.41;

$$K_2 = K_{orientation} = C \times \left(\frac{Angle}{Angle_o = 90}\right)^2 + D \times \left(\frac{Angle}{Angle_o = 90}\right) + E,$$

where C=0.6933, D=0.7882, and E=0.906; $K_3$=1 for the range of 15° C. to 30° C.; $K_4$=1; $K_5$=1 for as casted and machined; and $K_6$=1 for aluminum alloy casting, wherein Vel is the air velocity (m/s), Angle is the angle of air flow to the casting surface, and $Angle_{90}$ is the air flow perpendicular to the casting surface.

* * * * *